(12) United States Patent
Borowski et al.

(10) Patent No.: US 10,395,213 B2
(45) Date of Patent: Aug. 27, 2019

(54) SYSTEM AND METHOD FOR A COLLABORATIVE INFORMATION TECHNOLOGY GOVERNANCE

(75) Inventors: Zbigniew J. Borowski, Marietta, GA (US); Robert A. Palo, Concord, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1385 days.

(21) Appl. No.: 12/204,517

(22) Filed: Sep. 4, 2008

(65) Prior Publication Data

US 2010/0057522 A1    Mar. 4, 2010

(51) Int. Cl.
*G06Q 10/06* (2012.01)
*G06Q 10/10* (2012.01)

(52) U.S. Cl.
CPC ............ *G06Q 10/10* (2013.01); *G06Q 10/06* (2013.01); *G06Q 10/103* (2013.01)

(58) Field of Classification Search
CPC ....... G06Q 10/10; G06Q 10/06; G06Q 10/103
USPC .......................................................... 705/1
See application file for complete search history.

(56) References Cited

U.S. PATENT DOCUMENTS

| | | | |
|---|---|---|---|
| 6,088,702 A * | 7/2000 | Plantz et al. | |
| 6,505,233 B1 * | 1/2003 | Hanson et al. | 709/204 |
| 6,507,865 B1 * | 1/2003 | Hanson et al. | 705/36 R |
| 7,162,427 B1 * | 1/2007 | Myrick et al. | 705/1 |
| 2002/0099777 A1 * | 7/2002 | Gupta et al. | 709/206 |
| 2003/0182177 A1 * | 9/2003 | Gallagher et al. | 705/10 |
| 2004/0044648 A1 * | 3/2004 | Anfindsen et al. | 707/1 |
| 2004/0230658 A1 * | 11/2004 | Estrada et al. | 709/206 |
| 2005/0034079 A1 * | 2/2005 | Gunasekar et al. | 715/753 |
| 2005/0075916 A1 | 4/2005 | Lathram et al. | |
| 2005/0188016 A1 * | 8/2005 | Vdaygiri et al. | 709/205 |
| 2007/0043674 A1 | 2/2007 | DiFalco et al. | |
| 2007/0283410 A1 | 12/2007 | Hsu | |
| 2007/0288275 A1 * | 12/2007 | Kumar | 705/7 |
| 2008/0294408 A1 * | 11/2008 | Padmanabhan | 703/13 |

* cited by examiner

*Primary Examiner* — Dennis W Ruhl
(74) *Attorney, Agent, or Firm* — Jay Wahlquist; Andrew M. Calderon; Roberts Mlotkowski Safran Cole & Calderon, P.C.

(57) ABSTRACT

A system and method for a situational solution for collaborative information technology governance. The system comprises a situational environment information technology governance (SEIG) tool configured to facilitate one or more processes including: an entry process; a selection process; an authentication process; and a communication process. The method comprises entering a situation using the SEIG tool and describing the situation. The method further comprises choosing one or more applicable teams or subject matter experts and communicating with the one or more applicable teams and the subject matter experts using a collaborative technology.

20 Claims, 9 Drawing Sheets

US 10,395,213 B2

SYSTEM AND METHOD FOR A COLLABORATIVE INFORMATION TECHNOLOGY GOVERNANCE

FIELD OF THE INVENTION

The invention generally relates to a system and method for collaborative information technology governance and, in particular, to a situational solution for collaborative information technology governance.

BACKGROUND

Information Technology (IT) Governance has become increasingly important as technology has expanded and new standards, processes, architectures, etc., have been implemented. IT Governance is the development of leadership and organizational structures and processes that ensure that an organization's IT sustains and extends the organization's strategies and objectives. An organization's IT may include those processes involved in the study, design, development, implementation, support, and management of computer-based hardware and software systems. IT can also include the dissemination of information through communication and collaboration during the development stages of hardware and/or software systems.

IT Governance allows stakeholders, board members, managers, etc., to take more active roles in the development, implementation, support, and management of computer-based systems, such as hardware and software systems. This allows multiple persons and/or teams to communicate and collaborate with one another in order to share their expertise and ensure that a quality end product is produced. However, the quantity of communications and the degree of collaboration required to perform IT Governance tasks can be very time consuming.

For example, an IT Governance task, such as a new application, may be contemplated by an applications team. However, before the team can begin creating the new application, the team may need to check with a number of predefined teams, e.g., a standards team to determine what standards may be applicable to the new application. Depending on the complexity, this process may take days, weeks, or even months. Moreover, additional teams may need to be consulted, such as an asset reuse team to determine whether existing assets may be used to create the new application or whether new assets should be created for the new application. Once again, this process may take days, weeks, or even months. As the number of teams that need to be consulted increase, the amount of time required to reach agreements and strategic decisions on what path to take in a solution implementation increases. This increase in time can lead to massive product delays as well as lost revenue.

SUMMARY

In a first aspect of the invention, a system comprises a situational environment information technology governance (SEIG) tool configured to facilitate one or more processes including: an entry process; a selection process; an authentication process; and a communication process.

In another aspect of the invention, a computer implemented method, which is executable on program code embodied in a readable storage medium, for collaborative governance comprises entering a situation using a situational environment information technology governance (SEIG) tool and describing the situation. The method also includes choosing one or more applicable teams or subject matter experts and communicating with the one or more applicable teams and the subject matter experts using a collaborative technology.

In another aspect of the invention, a computer program product comprising a computer usable storage medium having readable program code embodied in the storage medium is provided. The computer program product includes at least one component operable to: enter a situation using a situational environment information technology governance (SEIG) tool; choose at least one team having an available subject matter expert; authenticate the available subject matter expert; and communicate with the available subject matter expert using a collaborative network.

In yet another aspect of the invention, a method for enhancing accessibility in a virtual universe, comprises providing a computer infrastructure being operable to: input a situation using a situational environment information technology governance (SEIG) tool and choose at least one team having an available member, the teams including a process team, methodology team, standards teams, design consulting team, architecture team, asset reuse team, innovation team, and deployment team. The computer infrastructure further operable to initiate an invitation to the available member from the chosen at least one team and collaborative with the available member via one or more of but not limited to instant messaging, teleconferencing, video conferencing, white board, and wikis.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
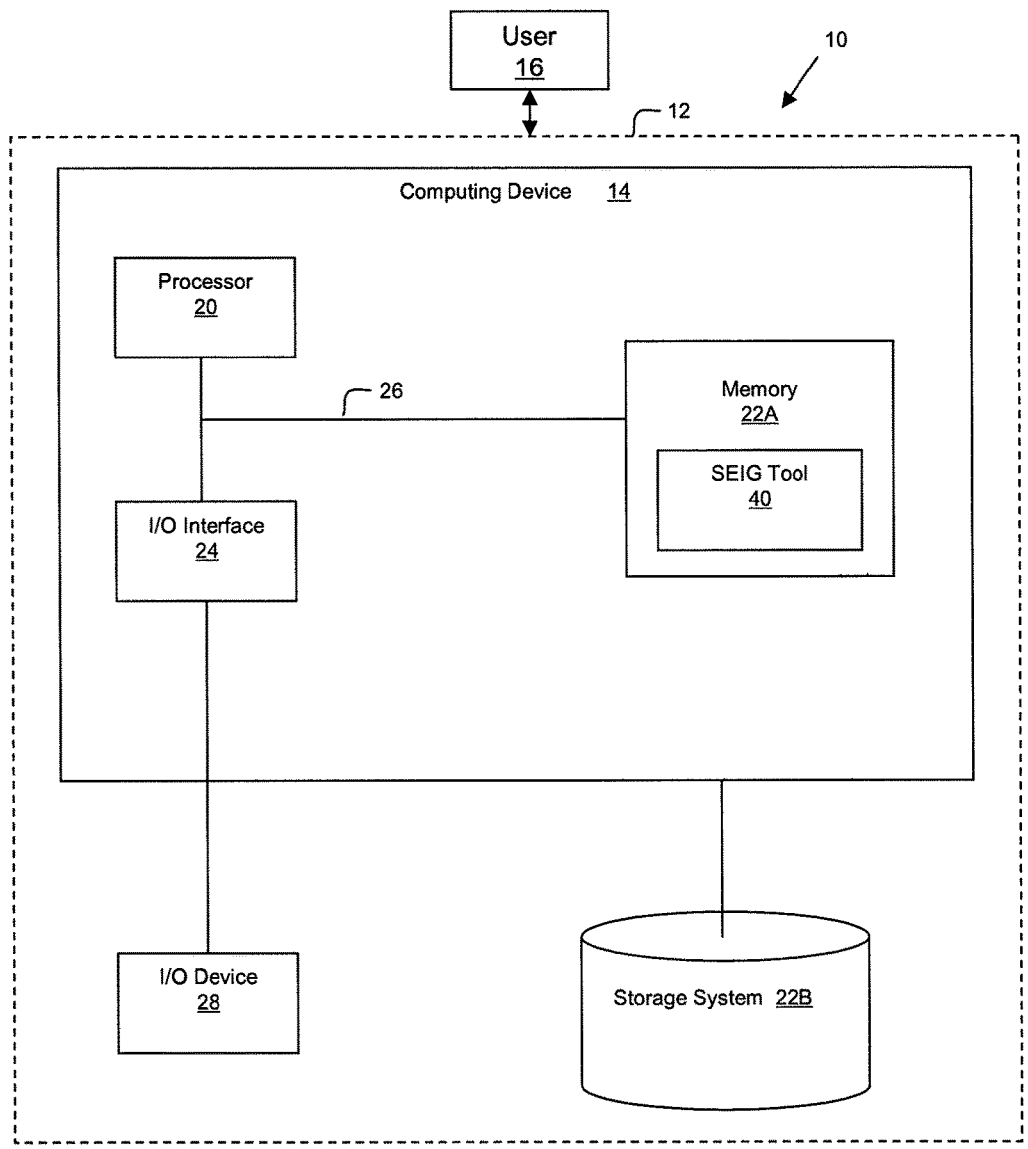
FIG. 1 shows an illustrative environment for implementing the steps in accordance with the invention.

The invention is directed to a system and method for collaborative IT governance and, in particular, to a situational solution for collaborative IT governance. More specifically, the invention introduces a Situational Environment IT Governance Tool (SEIG Tool) that is based on key concepts in IT Governance including collaboration, processes, and innovation. The SEIG Tool utilizes Situational Governance, which allows IT Governance to be performed in a situational style. This allows one or more communication methods to be chosen for a situation and used to communicate across an enterprise to respond to needs in an agile fashion. The SEIG Tool may be used by key decision makers to perform IT Governance tasks throughout the planning, design, and deployment stages.

The SEIG Tool is configured to generate savings by accelerating the decision making process by enabling early collaboration of key stakeholders. This may be performed, in part, by following a number of IT Governance patterns relating to tasks such as strategic solution planning, selection of development method, standards and architecture review and approval, hosting strategy and planning, asset reuse identification, and others. These tasks may be carried out according to decisions made by one or more stakeholders, subject matter experts (SMEs), etc., who are engaged throughout the decision making process.

The SEIG Tool may be implemented as a software solution, which is deployed on a server and provides a user interface to allow users to access one or more functions. The user interface may be embodied as a web client that may be accessible from a user's workstation. The SEIG Tool may be deployed as an application and utilize a number of Web 2.0 technologies, such as, e.g., wikis, blogs, white boards, etc.

A user may seek advise and/or expertise in a solution process by creating a request, such as an initial wiki entry, using the user interface. The format of the initial entry may be based on a template provided within the SEIG Tool, and may be customized, as needed, by the user submitting a request. The initial entry may describe a specific situation that needs to be resolved and may also facilitate solicitation of input from the key decision makers. Once a draft of the situation is made, the user/requestor may submit the situation, which makes the situation available for viewing by other users. Submission of the request may also be used to signal stakeholders, SMEs, decisions makers, etc., that a new situation needs to be handled and/or reviewed.

The user may select any number of teams having stakeholders, SMEs, decision makers, etc., that are available to communicate and/or collaborate about a submitted situation. Based on the selection, the SEIG Tool may initiate an invitation to communicate with the selected parties using a collaboration tool such as web conferencing, instant messaging, and/or social tagging, etc. This invitation may be reviewed and accepted by one or more of the selected parties. Upon acceptance, the accepting parties may be authenticated and communication between the user and one or more stakeholders, SMEs, decision makers, etc., can be initiated.

Accordingly, the invention allows enterprises to be more competitive and better suited to respond to on demand business challenges by reducing the time required to reach agreements and make strategic decisions on what path to take in a solution implementation.

SYSTEM ENVIRONMENT

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

a portable computer diskette,
    a hard disk,
    a random access memory (RAM),
    a read-only memory (ROM),
    an erasable programmable read-only memory (EPROM or Flash memory),
    a portable compact disc read-only memory (CDROM),
    an optical storage device, and/or The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer usable program code may be transmitted using any appropriate transmission media via a network.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that includes a processor 20, the memory 22A, an I/O interface 24, and a bus 26. The memory 22A may include a SEIG Tool 40, which may be embodied as an application.

The SEIG Tool 40 may be implemented as a Web client and configured to provide links and interfaces to one or more tools that facilitate decision making processes in a Situational Style. By using the SEIG Tool 40, users 16 can communicate across an enterprise, and respond to needs in an agile fashion. Moreover, the SEIG Tool 40 allows key stakeholders, application teams, and/or decision makers, etc., to collaborate early in the application process and also provides a single point of contact for information for key application process areas.

The SEIG Tool 40 may be used to supplement existing corporate processes and/or company-specific governance processes by integrating with tools that support existing processes. Thus, the SEIG Tool 40 can be implemented by any company involved in IT solution design and delivery. Additionally, in embodiments, the SEIG Tool 40 may also be customized for a specific IT environment.

The SEIG Tool 40 may be used to enable Situational Governance capabilities for an on demand enterprise. Situational governance may include identifying needs and situations so that multiple people can collaborate with one another using existing technologies to address problems effectively and efficiently. By utilizing the SEIG Tool, early communication and collaboration among key stakeholders, decision makers, etc., may be performed in accordance with the invention, e.g., process described herein.

The computing device 14 also includes a processor 20, the memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution.

The computing device 14 is in further communication with the external I/O device/resource 28 and the storage system 22B. For example, the I/O device 28 can comprise any device that enables an individual to interact with the computing device 14 or any device that enables the computing device 14 to communicate with one or more other computing devices using any type of communications link. The external I/O device/resource 28 may be keyboards, displays, pointing devices, microphones, headsets, etc. The storage system 22B can include an "inventory" of sounds, modifications, etc., which may be selected by the user's avatar.

In general, the processor 20 executes computer program code, which is stored in the memory 22A and/or storage system 22B. The computer code may be representable of the functionality of the SEIG Tool. While executing computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the server 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the processes described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

EXEMPLARY IMPLEMENTATION OF THE SYSTEM

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
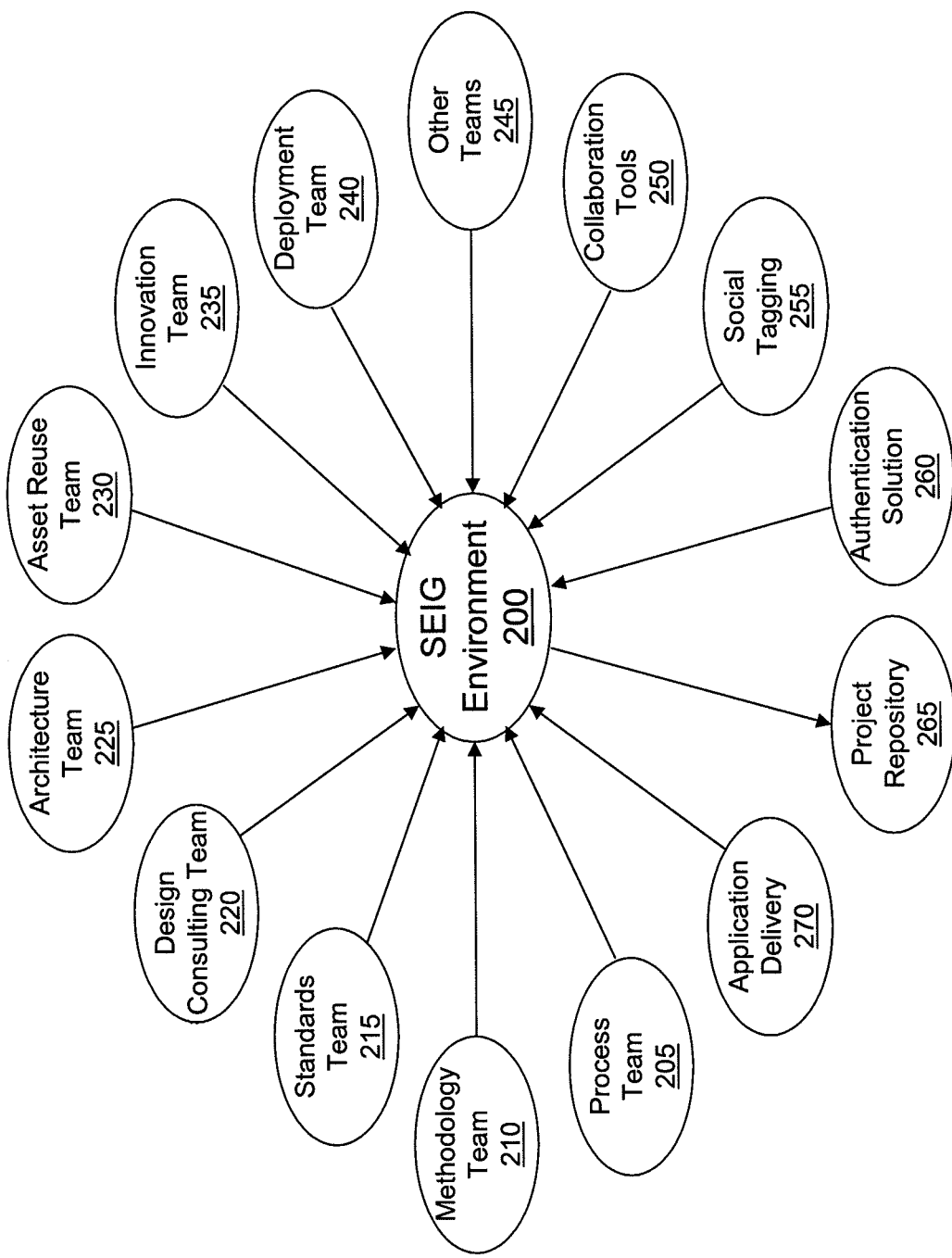
FIG. 2 shows a system context diagram of a SEIG environment in accordance with aspects of the invention.

FIG. 2 illustrates a system context diagram of a SEIG environment, which may be used by the SEIG Tool in accordance with embodiments of the present invention. More specifically, FIG. 2 includes a SEIG Environment 200 and multiple teams that may be associated with and/or used by the SEIG Tool. Exemplary teams may relate to one or more stages in the application process and include one or more SMEs relating to the stage. The SEIG Environment 200 may also include tools that may be used to, e.g., facilitate communication and collaboration between users, teams, SMEs, decision makers, etc.

For example, a Process Team 205 may be included in the SEIG Environment 200. The Process Team 205 may be used to track and/or manage IT assets. The tracking and/or managing IT assets may be performed using any number of existing business transportation management tools that are configured to identify, record, and/or track solutions used throughout the application process.

The SEIG Environment 200 may also include a Methodology Team 210 to obtain methods for delivering solutions. A Standards Team 215 may also be included to identify what standards may be needed throughout the application process and determine whether any possible standards problems may arise. Exemplary standards may be related to design and/or hosting standards.

A Design Consulting Team 220 or eBusiness Application Center of Competence (COC) may be included in the SEIG Environment 200 to recommend one or more technologies that may be needed in the application process. In embodiments, the Design Consulting Team 220 may also be used to determine what kind of licenses may be required for the application.

An Architecture Team 225 may be included in the SEIG Environment 200 to determine what information and/or resources may be needed throughout the application process. Additionally, the Architecture Team 225 may provide information on who should approve one or more aspects of the application before, during, and/or after application delivery.

The SEIG Environment 200 may include an Asset Reuse Team 230. The Asset Reuse Team 230 can be used to identify reusable management assets by consulting already known information. Embodiments of the SEIG environment 200 may also include an Innovation Team 235 to assess the type and/or degree of influence the solution will have from a business, technical, and/or economical, etc., viewpoint. Additionally, a Deployment Team 240 may be included to install and move the application into production.

While a number of teams 205, 210, 215, 220, 225, 230, 235, and 240 have been described in FIG. 2, it should be understood that a number of additional teams known to those of skill in the art may be included in embodiments of the invention. These additional teams are illustrated in FIG. 2 as Other Team 245.

Tools may also be included in the SEIG Environment 200. For example, embodiments may include one or more Collaboration Tools 250, such as instant messaging, teleconferencing, video conferencing, white board, wikis, etc., which allow two or more parties to collaborate with one another. Additional tools, such as Social Tagging 255 may also be included to categorize content that is being used in the SEIG Environment 200.

The SEIG Environment 200 may include an Authentication Solution 260 to identify stakeholders, decision makers, users, etc., that are using the SEIG Tool. The Authentication Solution 260 may include a custom authentication tool or any existing authentication tool.

A Project Repository 265 may be included in the SEIG Environment 200 to define requirements and determine what information and/or recourses are needed for each team. The SEIG Environment 200 may also include an Application Delivery Tool 270 that may deliver an application to one or more teams, SMEs, stakeholders, etc. While tools 250, 255, 260, 265, and 270 have been described, it should be understood that these tools are merely exemplary and several additional tools in any desired combination may be utilized when implementing the SEIG Environment 200.

Figure 3:
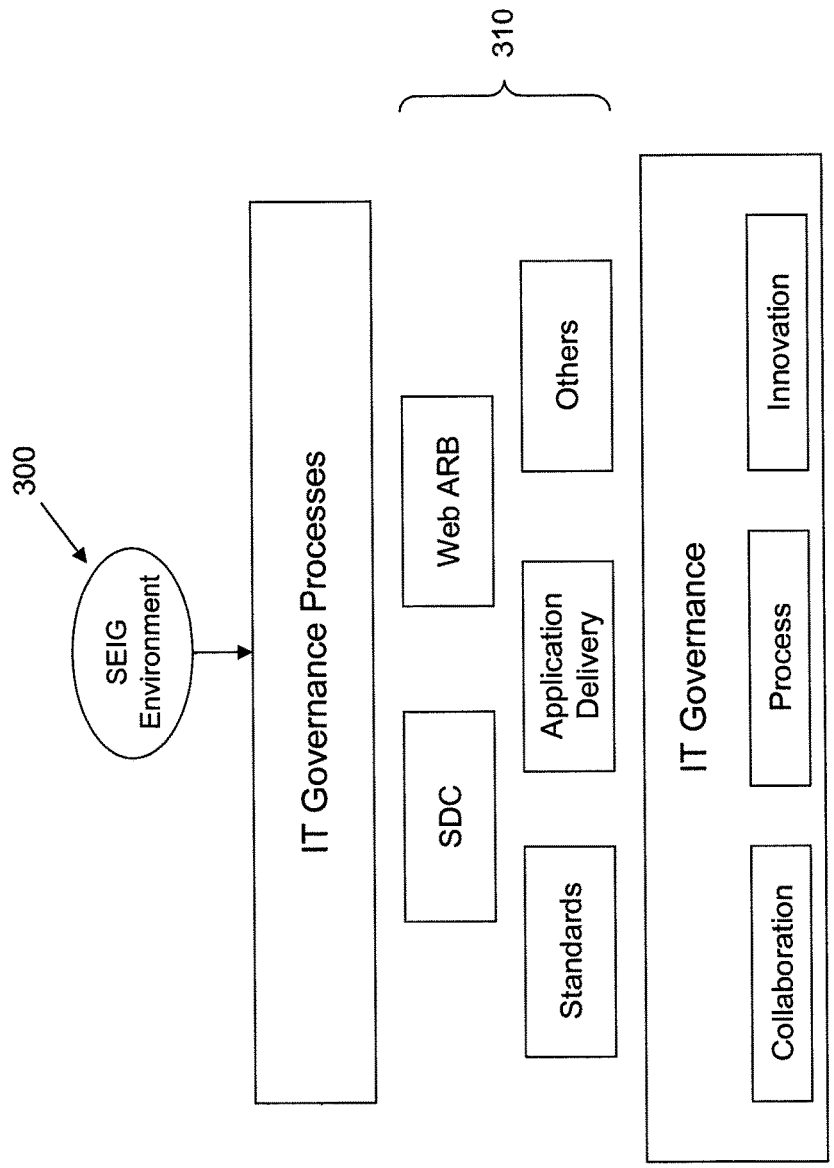
FIG. 3 shows a high level view of a SEIG Tool in support of corporate governance processes according to aspects of the invention.

FIG. 3 shows a high level view of a SEIG Tool in support of corporate governance processes according to embodiments of the present invention. In particular, FIG. 3 includes an SEIG Environment 300 that may include one or more IT Governance processes 310. These processes 310 may include, e.g., software development centers (SDCs), web architecture review board (ARB), standards processes, application processes, as well as a number of additional IT Governance processes. These processes may be developed based on key concepts that lay the foundations for IT Governance including collaboration, process, and innovation.

Figure 4:
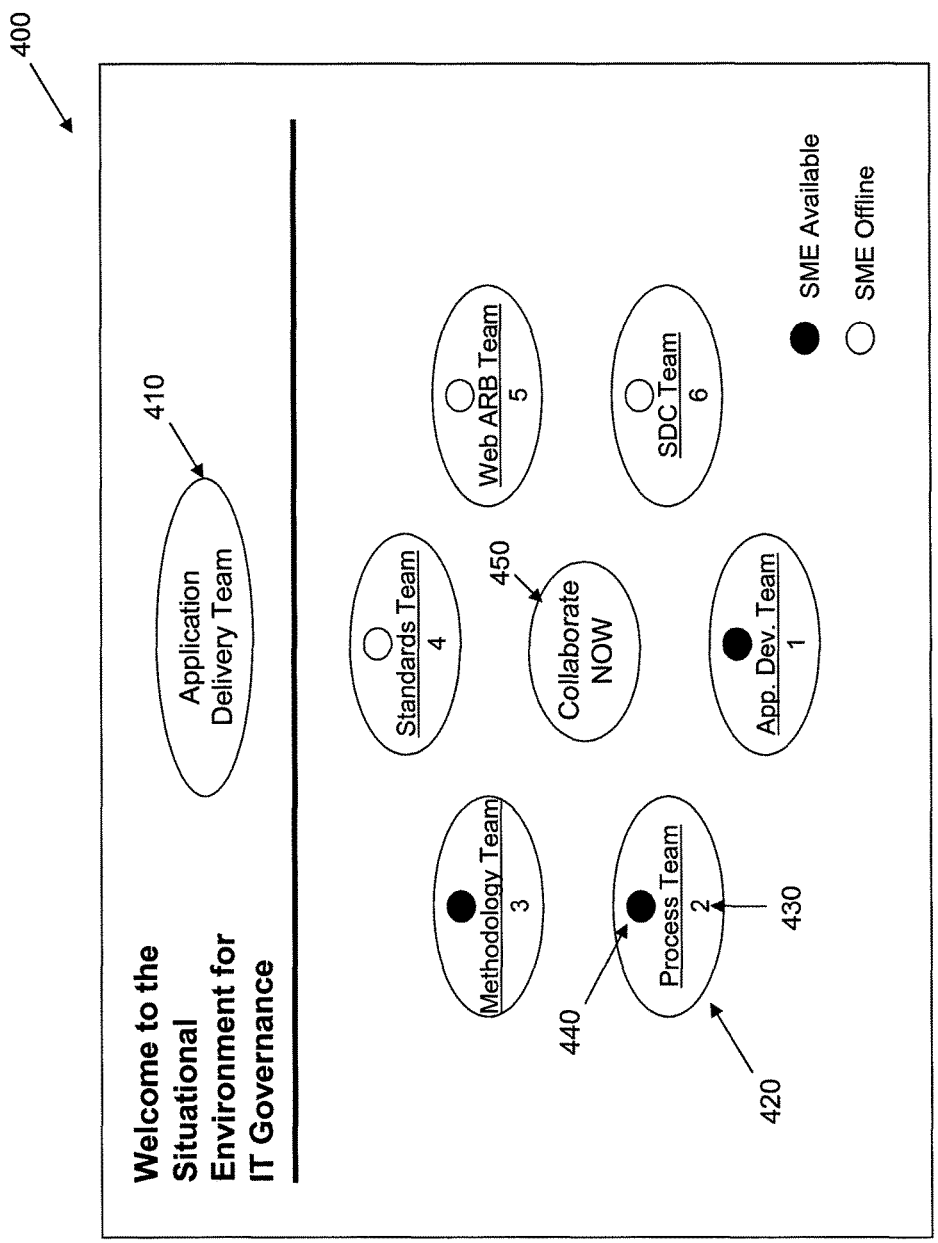
FIG. 4 shows an exemplary landing page according to aspects of the invention.

FIG. 4 shows an exemplary landing page in accordance with embodiments of the invention. The exemplary landing page 400 may include a number of links and information for users. For example, the landing page 400 may include a link 410 that allows a user to create a new entry or situation. When selected, this link 410 may take the user to any number of Web 2.0 applications such as a wiki, social networking site, blog, java applet, etc., which allows situations to be inputted and application teams to collaborate with key stakeholders to make strategic decisions about the application early in the application process. Exemplary screens for viewing, entering, and describing situations are described in more detail below in FIGS. 7 and 8.

FIG. 4 may also include a visual representation of one or more teams 420. The teams 420 may include, e.g., Process Teams, Methodology Teams, Standards Teams, Design Consulting Teams, Architecture Teams, Asset Reuse Teams, Innovation Teams, Deployment Teams, as well as any number of other teams or combinations thereof. The teams 420 may also include an identifier 430, which indicates the order in which a typical design may follow. Thus, for example, a typical design may flow through an Application Development Team, followed by a Process Team, a Methodology Team, a Standards Team, a Web Architecture Review Board, and a Software Delivery Center.

A number of users may utilize the SEIG Tool to perform IT Governance functions. For example, users may include a party that has a situation. Users may also be team members, such as stakeholders, decisions makers, and/or SMEs, etc., that represent various problem domains such as, e.g., architecture, hosting, standards, etc. In embodiments, one or more team members may be available to communication and/or collaborate with the party that has a situation. The availability of the team member may be indicated by an awareness feature or status indicator 440, which visually indicates to one or more users that a team member representing a specific team or SME group is available for communication. For example, a team having at least one available team member online may by represented by a darkened status indicator and a team having no available team members online may be represented by an undarkened status indicator. The availability of team members may be arbitrary or determined by a company policy.

One or more of the teams 420 may include a link to a separate SME page, which includes information about the group, common questions and answers, etc. For example, the separate SME page may include a list of questions that are frequently asked to the team 420 as well as answers to the questions. This allows users to quickly check whether a situation has been previously addressed and whether or not a specific team should be included in the collaboration. Moreover, this feature saves time on communication and collaboration by making sure relevant teams are included in the collaboration early in the process and by eliminating duplicative requests, which have already been addressed on a SME page.

The SEIG Tool allows a user to identify and select applicable teams 420 in which the user can collaborate with and seek advice from. Once the applicable teams 420 are selected, the user may select a collaborate now 450 feature, which allows the user and the selected teams to collaborate. This collaboration may occur in a separate session and utilize tools available in the SEIG Environment including instant messaging, teleconferencing, video conferencing, white board, and/or wikis, etc. In embodiments, the collaborate now 450 feature may also be used to schedule meetings, track and/or record participation, etc.

Figure 5:
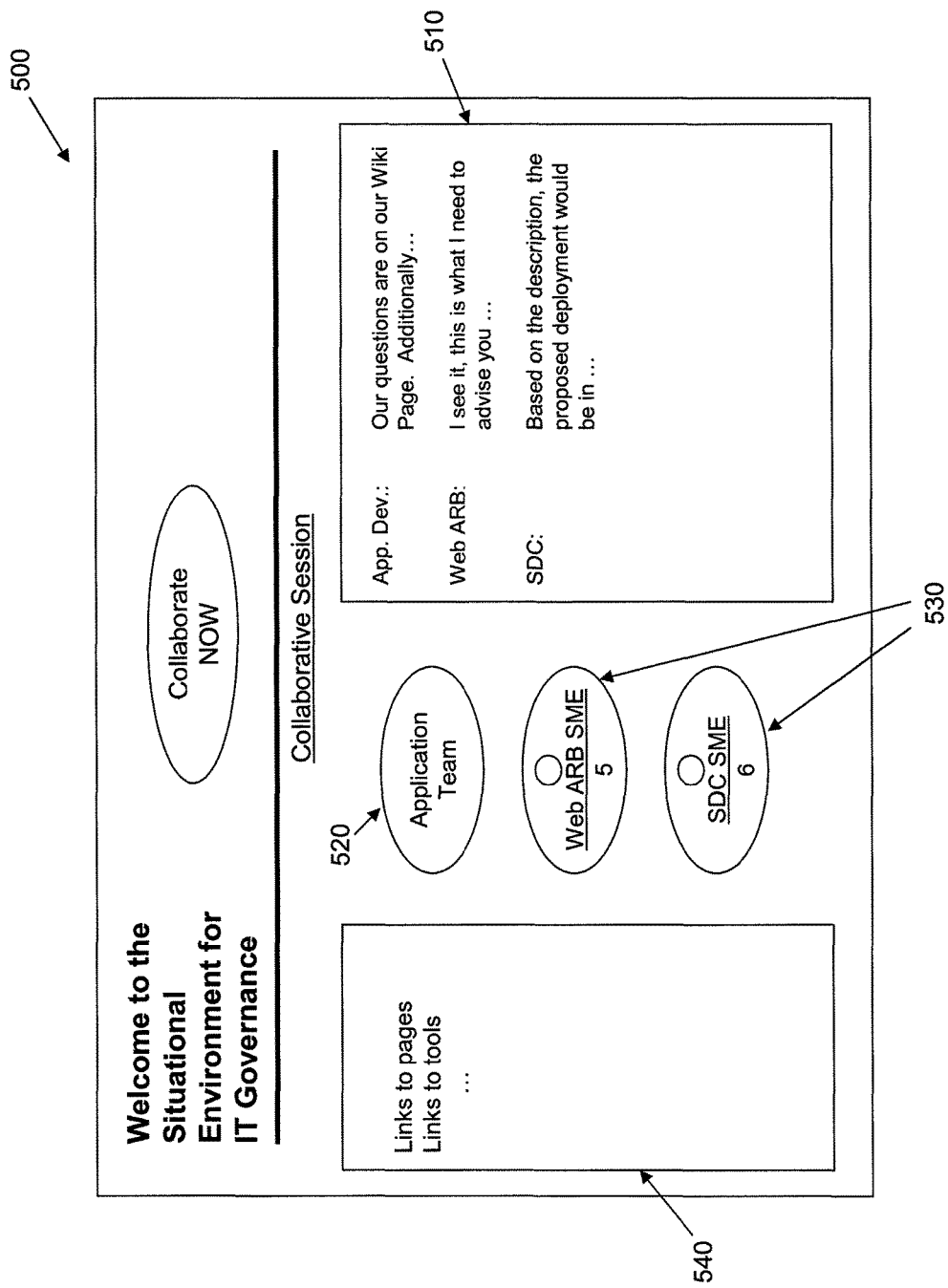
FIG. 5 shows an exemplary collaboration session between a plurality of parties according to aspects of the invention.

FIG. 5 illustrates an exemplary collaboration session between teams selected by the user in accordance with embodiments of the invention. In particular, the user may select a team and/or SME group to collaborate with and a collaboration session 500 may be created. The collaboration session 500 illustrated in FIG. 5 includes a chat session 510 between the user or application team with the situation 520 and one or more of the SMEs, stakeholders, decisions makers, etc., that are available for each of the selected teams 530. In embodiments, multiple SMEs, stakeholders, decisions makers, etc., may be represented from one or more of the teams 530.

Those participating in the collaborative session may view the user's entry prior to, during, and/or after the collaborative session begins and provide information, comments, etc., to the user based on the entry. For example, a SME may look at the description in the entry as well as what types of questions the user is asking about the situation. From this, the SME may provide answers for the user and/or add additional questions or concerns. Moreover, in embodiments, the SME may add answers and/or questions directly to the user's entry. These additions may be privately or publicly available for other users to see.

As illustrated in FIG. 5, the teams 530 may collaborate by answering questions, providing advice, proposing solutions, pointing out possible problems, affirming and/or denying a proposed solution, etc. For example, an application team or user 520 may indicate to the session members that the user's questions are posted on a wiki page and provide additional questions or concerns not already expressed on the wiki page. Based on this information, an SME may ask for additional information and/or clarifications on the questions.

An SME may also indicate, e.g., where, how, and/or when the solution should be deployed. Moreover, in embodiments, the collaboration between the users, SMEs, etc., may lead to a formal engagement that the SEIG Tool may handle by, e.g., providing links to one or more web sites that are configured to handle formal requests for service. The collaborative session may also include, e.g., a section comprising additional information 540 for users such as links to pages, links to tools, common questions and answers, etc.

In embodiments, the users, SMEs, etc, may change and/or add additional collaboration tools to the communication. For example, a user may request immediate collaboration via a web conferencing tool, which may be included in the SEIG Environment. This allows issues to be addressed quickly and efficiently by users, SMEs, decision makers, etc., while adhering to principals of IT Governance.

Figure 6:
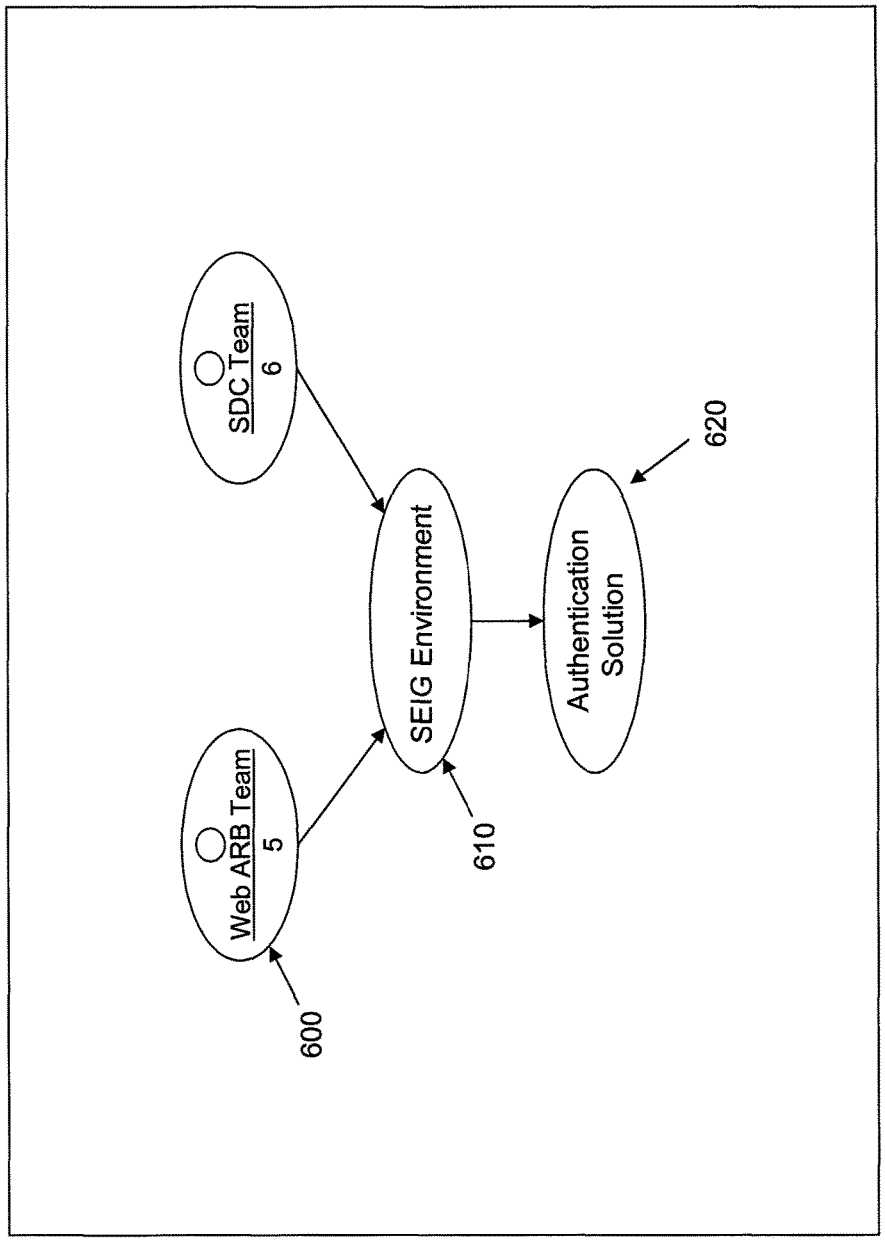
FIG. 6 shows an authentication solution in accordance with aspects of the invention.

FIG. 6 illustrates an authentication solution according to embodiments of the invention. The authentication solution 620 may be used to authenticate users, teams 600, SMEs, stakeholders, decision makers, etc., before granting them access to an entry and/or before setting up a collaborative session. The authentication may be included in the SEIG Environment 610 and comprise any number of authentication solutions known to those in the art.

For example, a user may select one or more teams having available SMEs that the user wants to include in a collaborative session. However, before a collaborative session can be initiated, the user, the selected teams 600, and/or the available SMEs within the selected teams 600 may be identified and authenticated by an authentication solution 620. The processes involved in identifying and authenticating users, teams 600, SMEs, etc., may be performed in the SEIG Environment 610.

SITUATION ENTRY

Figure 7:
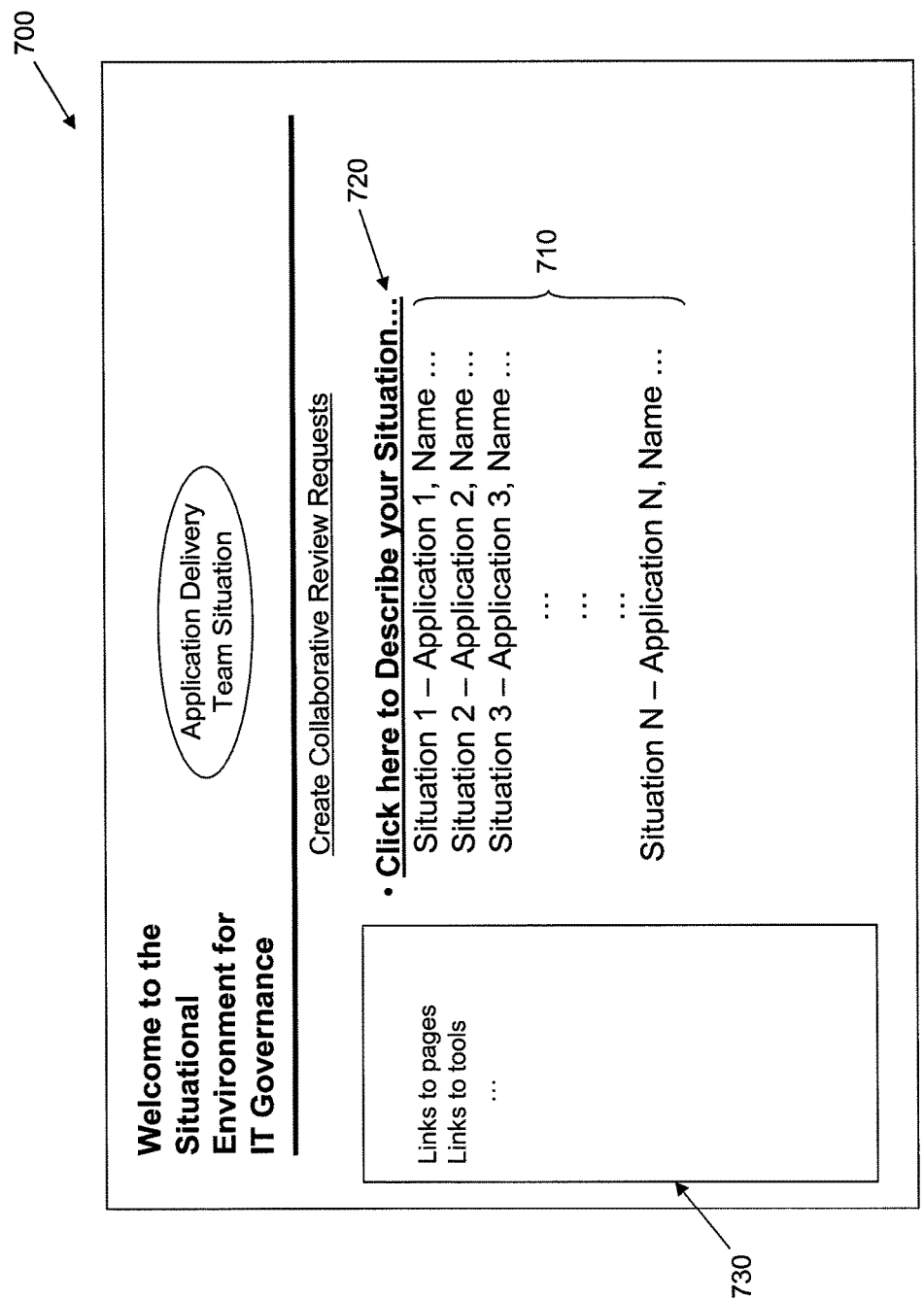
FIG. 7 shows an exemplary screen for viewing and entering situations into the SEIG Tool according to aspects of the invention.

FIG. 7 shows an exemplary screen for viewing and entering situations into the SEIG Tool in accordance with embodiments of the invention. More specifically, FIG. 7 includes an exemplary screen 700, which allows one or more users to view existing situations 710 and/or enter a new situation 720 using the SEIG Tool's situational capability. The new situation may also be used for collaboration with SMEs representing various domains of expertise.

Users wanting to view existing situations 710 may do so by selecting the situation. In embodiments, situations may be hidden from unauthorized users and/or an authentication process may be employed to prevent certain users, stakeholders, SMEs, etc., from gaining access to situation details.

Users entering a new situation 720 may do so, e.g., by selecting a link that may take the user to a data input screen where the user may enter information about the situation. Once a new situation 420 is entered, the situation may be presented to one or more users, stakeholders, SMEs, etc., using the exemplary screen in FIG. 7. This allows the situation to be readily available for review and saves on communication and collaboration time.

In embodiments, the screen 700 may also include a section comprising additional information 730 for users such as links to pages, links to tools, common questions and answers, etc. For example, the screen 700 may include a link to one or more SME pages and/or to tools that help the user better identify and/or describe a situation. This feature is equivalent to the feature 540 described above in FIG. 5.

Figure 8:
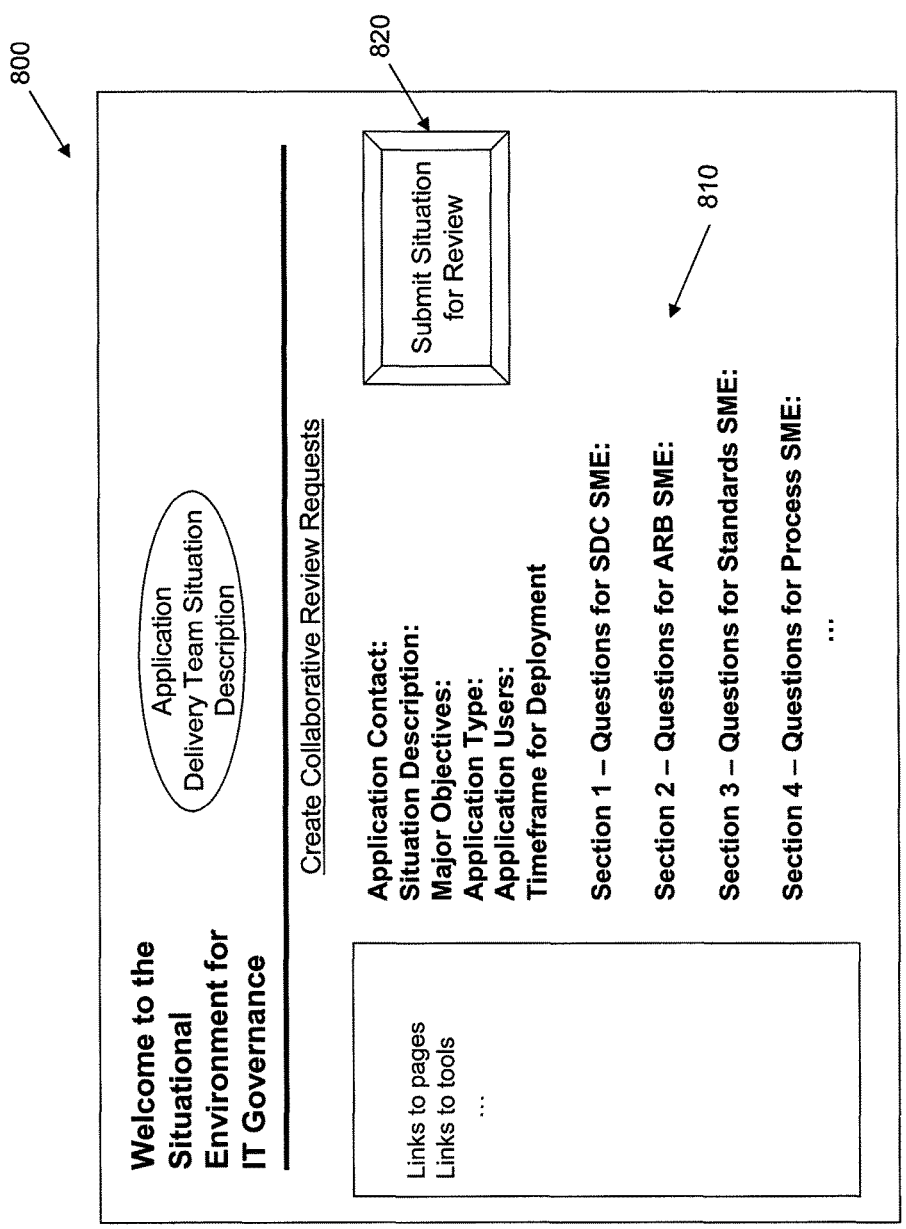
FIG. 8 shows an exemplary screen for creating and describing a situation request according to aspects of the invention.

FIG. 8 illustrates an exemplary screen for creating and describing a situation request in accordance with embodiments of the invention. The users entering situation requests using the SEIG Tool may include teams and/or individuals seeking advise in making application design decisions. The initial entry may utilize the SEIG Tool's situational capability to provide on demand collaboration and feedback between those representing various domains of expertise such as, e.g., SMEs, decision makers, etc.

The screen 800 in FIG. 8 may be accessed, e.g., when a user requests to enter a new situation (as discussed in reference to FIG. 7). The screen 800 may include any number of questions and/or entry fields 810, which further define the situation and the issues faced by the user. For example, the user may be asked to describe, e.g., one or more of: an application contact; a situation description; major objectives; application type; application users; timeframe for deployment; and/or questions for one or more teams; etc. One or more of these fields may be optional or mandatory.

Once the situation review request is entered, it can be submitted using any number of submission tools, represented as submission button 820. This allows the submitted request to be viewable to users, stakeholders, SMEs, etc., as illustrated in FIG. 7. Moreover, embodiments may also allow the user to update the request and/or delete the request as new information becomes available. This allows users to keep other users, stakeholders, SMEs, etc., informed of the situation and ensures that communication and collaboration time is not spent on reviewing outdated and/or obsolete requests.

EXEMPLARY PROCESS

Figure 9:
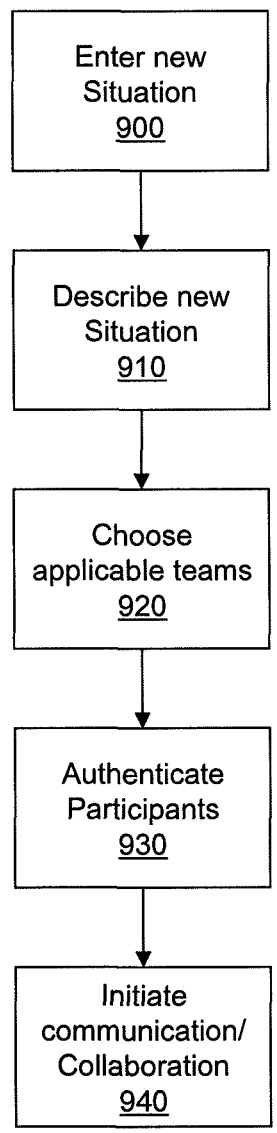
FIG. 9 shows a flow chart of an exemplary process in accordance with aspects of the invention.

FIG. 9 shows a flow chart of an exemplary process in accordance with aspects of the invention. In particular, FIG. 9 allows a user to enter a new situation, at step 900. The user may describe the newly entered situation, at step 910. Based on the situation, the user may choose one or more applicable teams that the user would like to or needs to collaborate with, at step 920. In embodiments, the user, the chosen teams, and/or the available members within the chosen teams may be authenticated, at step 930, and communication and/or collaboration may be initiated, at step 940.

By utilizing the processes described herein, the SEIG Tool enables enterprise-wide collaboration in performing enterprise IT Governance functions. The SEIG Tool also improves communication between major stakeholders participating in formal reviews of IT solution architectures. Moreover, the SEIG Tool enables and automates communications among major parties involved in the solution delivery process, such as, e.g., application owners, standards owners, ARBs, etc.

The SEIG Tool permits situation application features and technologies to be implemented and facilitates early decision making and review of IT solution architectures. Moreover, by integrating with other tools used to support of the end-to-end solution delivery, the SEIG Tool accommodates parties that need to be involved in the Situational IT Governance process.

While the invention has been described in terms of embodiments, those skilled in the art will recognize that the invention can be practiced with modifications and in the spirit and scope of the appended claims. Additionally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A system comprising:
a computer infrastructure which comprises a computing device including a processor and a memory which includes a situational environment technology governance (SEIG) tool, the computer infrastructure being configured to:
provide a field for entry of one or more questions in an entry screen which is provided by the SEIG tool in order to facilitate communications with one or more of a user, a subject matter expert, a stakeholder, and a decision maker;
receive a selection of the one or more of the user, the subject matter expert, the stakeholder, and the decision maker using the SEIG tool;
initiate an invitation to the selected one or more of the user, the subject matter expert, the stakeholder, and the decision maker using the SEIG tool; and
allow collaboration between the selected one or more of the user, the subject matter expert, the stakeholder, and the decision maker using a collaborative technology of the SEIG tool,
wherein the receiving the selection of the one or more of the user, the subject matter expert, the stakeholder, and the decision maker using the SEIG tool includes receiving a selection of one or more teams from a plurality of teams via the SEIG tool,
wherein a landing page interface of the SEIG tool comprises a virtual representation which includes a graphical user interface (GUI) comprising graphical elements of the selected one or more teams using the SEIG tool, a design order identifier associated with each of the graphical elements of the selected one or more teams of the plurality of teams, a graphical link which allows the user to be taken to one of a social networking site, blog, and java applet to input situations and collaborate with key stakeholders when selected, and a status indicator which is a circular graphical element that is filled when at least one team member of the one or more teams is online and available for communication and is unfilled when no team member of the one or more teams is online and is available for communication, wherein the design order identifier associated with each of the selected one or more teams indicates an order in which a design flow occurs for each of the selected one or more teams, wherein the SEIG tool collaborating between the one or more of the user, the subject matter expert, the stakeholder, and the decision maker utilizes a plurality of collaboration tools which include instant messaging, teleconferencing, video conferencing, white board, and wikis, and wherein the SEIG tool comprises a social tagging tool which categorizes content that is used in the collaborating between the one or more of user, the subject matter expert, the stakeholder, and the decision maker, wherein the SEIG tool is a web client application that provides the GUI which includes the field of entry, links, and interfaces to one or more of the plurality of collaboration tools, wherein the graphical elements of the selected one or more teams in the landing page interface comprise a link to a separate subject matter experts (SME) page which includes a list of questions and answers to the list of questions to show whether a situation has been previously addressed, wherein the collaborative technology of the SEIG tool includes a chat session between the selected one or more of the user, the subject matter expert, the stakeholder, and the decision maker, graphical elements of the selected one or more teams using the SEIG tool, the status indicator which is the circular graphical element that is filled when at least one team member of the one or more teams is online and available for communication and is unfilled when no team member of the one or more teams is online and is available for communication, a section including additional information such as at least one links to pages, links to tools, common questions and answers, and a collaborate now feature to schedule meetings, track participation, and record participation.

2. The system of claim 1, wherein the SEIG tool is further configured to enter a situation in the SEIG tool using a wiki, the white board, and a blog.

3. The system of claim 1, wherein the SEIG tool is further configured to receive the selection of the one or more of the user, the subject matter expert, the stakeholder, and the decision maker using the SEIG tool in order to collaborate.

4. The system of claim 1, wherein:
the SEIG tool providing the field for entry of the one or more questions in an entry screen further includes receiving a situation entered into the entry screen of the SEIG tool via a user interface of the SEIG tool embodied as a web client;
wherein the landing page further comprises: a visual representation of the plurality of teams and the status indicator has first and second states indicating that a member of a respective one of the plurality of teams is available or unavailable, respectively, for communication; and
the SEIG tool collaborating between the one or more of the user, the subject matter expert, the stakeholder, and the decision maker further includes creating a collaboration session in which respective members of the selected one or more teams are participants, wherein the collaboration session occurs in a separate session from the entry process and the selection process, and the collaboration session utilizes an electronic collaboration tool of the SEIG tool.

5. The system of claim 4, wherein the entry screen is linked to the landing page.

6. The system of claim 5, wherein the entry screen includes a plurality of sections for a plurality of subject matter experts and each section includes questions for the plurality of subject matter experts.

7. The system of claim 6, wherein the entry screen further includes a submission button for allowing the users, the stakeholders, the subject matter experts, and the decision maker to view the situation.

8. The system of claim 7, wherein the design flow defines the order in which the design flows occurs through a plurality of groups, the plurality of groups including at least one subject matter expert.

9. A computer implemented method, which is executable on program code embodied in a computer readable storage medium, for collaborative governance comprising:
entering a situation using a situational environment information technology governance (SEIG) tool;
describing the situation;
updating the situation as new information becomes available;
receiving a choosing of one or more applicable teams or subject matter experts using the SEIG tool;
initiating an invitation to the chosen one or more applicable teams or subject matter experts using the SEIG tool; and
communicating with the chosen one or more applicable teams and the subject matter experts using a collaborative technology of the SEIG tool;
wherein the entering, the describing, the receiving, and the communicating, are performed using a computer device comprising a processor and the describing includes entering at least one question into a field of an entry screen provided by the SEIG tool to facilitate the communicating with the one or more applicable teams and subject matter experts using the collaborative technology, the field describing one or more of an application contact, a situation description, major objectives, an application type, application users, a timeframe for deployment, and questions for the one or more applicable teams or subject matter experts, and
wherein the SEIG tool is a Web client and configured to provide links and interfaces to one or more tools that enable decision making processes in a situational style, and further configured to enable situational governance capabilities for an on demand enterprise, and the links are included in a landing page that provides information for users and a visual representation of the one or more applicable teams or the subject matter experts,
wherein the choosing includes selecting the one or more applicable teams from a plurality of teams via the SEIG tool,
wherein a landing page interface of the SEIG tool comprises a virtual representation which includes a graphical user interface (GUI) comprising graphical elements of the selected one or more applicable teams using the SEIG tool, a design order identifier associated with each of the graphical elements of the selected one or more applicable teams of the plurality of teams, a graphical link which allows the user to be taken to one of a social networking site, blog, and java applet to input situations and collaborate with key stakeholders when selected, and a status indicator which is a circular graphical element that is filled when at least one team member of the one or more available teams is online and available for communication and is unfilled when no team member of the one or more available teams is online and is available for communication, wherein the design order identifier associated with each of the selected one or more teams indicates an order in which a design flow occurs for each of the selected one or more applicable teams, wherein the SEIG tool communicating with the one or more applicable teams and the subject matter experts utilize a plurality of collaboration tools which include instant messaging, teleconferencing, video conferencing, white board, and wikis, wherein the SEIG tool comprises a social tagging tool which categorizes content that is used in the collaborating between the one or more of user, the subject matter expert, the stakeholder, and the decision maker, wherein the graphical elements of the selected one or more applicable teams in the landing page interface comprise a link to a separate subject matter experts (SME) page which includes a list of questions and answers to the list of questions to show whether a situation has been previously addressed, and wherein the collaborative technology of the SEIG tool includes a chat session between the selected one or more applicable teams, graphical elements of the selected one or more applicable teams using the SEIG tool, the status indicator which is the circular graphical element that is filled when at least one team member of the one or more applicable teams is online and available for communication and is unfilled when no team member of the one or more applicable teams is online and is available for communication, a section including additional information such as at least one links to pages, links to tools, common questions and answers, and a collaborate now feature to schedule meetings, track participation, and record participation.

10. The method of claim 9, wherein the steps of claim 9 are implemented in hardware or a combination of software and hardware.

11. The method of claim 9, wherein the steps of claim 9 are offered by a service provider based on one of a fee and subscription basis.

12. The method of claim 9, wherein:
describing the situation includes providing at least one of an application contact, a major objective, an application type, an application user, and a timeframe for deployment the question; and
the choosing of the one or more applicable teams or the subject matter experts is based on the situation.

13. The method of claim 9, wherein:
the entering and the describing are performed using one or more user interfaces of the SEIG tool;
wherein the status indicator has first and second states indicating that a member of a respective one of the plurality of teams is available or unavailable, respectively, for communication; and
the communicating includes creating a collaboration session in which respective members of the selected one or more teams are participants, wherein the collaboration session occurs in a separate session from the entry process and the selection process, and the collaboration session utilizes an electronic collaboration tool of the SEIG tool.

14. A computer program product comprising a non-transitory computer usable storage medium having readable program code stored in the storage medium, the program code when executed on a computer device causes the computer device to:

enter a situation using a situational environment information technology governance (SEIG) tool;

receive a selection of at least one team having an available subject matter expert using the SEIG tool;

initiate an invitation to the selected at least one team having the available subject matter using the SEIG tool; and communicate with the selected at least one team having the available subject matter expert using a collaborative network of the SEIG tool, wherein entering the situation permits entry of at least one question into a field of an entry screen provided by the SEIG tool to facilitate the communicating with the at least one team and the subject matter expert using the collaborative technology and the entering a situation is completed before the communicating with the available subject matter expert using the collaborative network, wherein the selection of at least one team includes selecting the at least one team from a plurality of teams via the SEIG tool, wherein a landing page interface of the SEIG tool comprises a virtual representation which includes a graphical user interface (GUI) comprising graphical elements of the selected at least one team, a design order identifier associated with each of the graphical elements of the selected at least one team of the plurality of teams, a graphical link which allows the user to be taken to one of a social networking site, blog, and java applet to input situations and collaborate with key stakeholders when selected, a status indicator which is a circular graphical element that is filled when at least one team member of the at least one team is online and available for communication and is unfilled when no team member of the at least one team is online and is available for communication, and a collaborate now feature which allows collaboration to occur in a separate session utilizing instant messaging, wherein the design order identifier associated with each of the selected at least one team indicates an order in which a design flow occurs for each of the selected at least one team, wherein the collaborative network includes instant messaging, teleconferencing, video conferencing, white board, and wikis, wherein the SEIG tool comprises a social tagging tool which categorizes content that is used in the collaborating between the one or more of user, the subject matter expert, the stakeholder, and the decision maker, wherein the SEIG tool is a web client application that provides the GUI which includes the field of entry, links, and interfaces to one or more of the plurality of collaboration tools, wherein the graphical elements of the selected at least one team in the landing page interface comprise a link to a separate subject matter experts (SME) page which includes a list of questions and answers to the list of questions to show whether a situation has been previously addressed, and wherein the collaborative technology of the SEIG tool includes a chat session between the selected at least one team using the SEIG tool, the status indicator which is the circular graphical element that is filled when at least one team member of the at least one team is online and available for communication and is unfilled when no team member of the at least one team is online and is available for communication, a section including additional information such as at least one links to pages, links to tools, common questions and answers, and the collaborate now feature to schedule meetings, track participation, and record participation.

15. The computer program product of claim 14, wherein the SEIG tool is configured for use by a process team, methodology team, standards teams, design consulting team, architecture team, asset reuse team, innovation team, and deployment team.

16. The computer program product of claim 14, wherein the SEIG tool includes a project repository tool and an application delivery tool.

17. The computer program product of claim 14, wherein the SEIG tool provides on demand collaboration and feedback between a user and the available subject matter expert.

18. A method, comprising:
providing a computer infrastructure comprising a computer device having a processor which performs a plurality of steps of:
inputting a situation using a situational environment information technology governance (SEIG) tool that provides a field for entry of one or more questions in an entry screen which is provided by the SEIG tool in order to facilitate communications with one or more available team members from at least one team, the at least one team including at least one of a process team, a methodology team, a standards teams, a design consulting team, an architecture team, an asset reuse team, an innovation team, and a deployment team;
hiding the situation from unauthorized users to prevent the unauthorized users from gaining access to details of the situation;
receiving a selection of at least one team having the available member, the at least one team including at least one of the process team, the methodology team, the standards teams, the design consulting team, the architecture team, the asset reuse team, the innovation team, and the deployment team using the SEIG tool;
initiating an invitation to the selected available member from the chosen at least one team using the SEIG tool;
collaborating with the selected available member via one or more of instant messaging, teleconferencing, video conferencing, white board, and wikis using a collaborative technology of the SEIG tool,
wherein the inputting, the receiving, the initiating, and the collaborating are performed using the SEIG tool of the computer device,
wherein the selection of at least one team includes selecting the at least one team from a plurality of teams via the SEIG tool,
wherein a landing page interface of the SEIG tool comprises a virtual representation which includes a graphical user interface (GUI) comprising graphical elements of the selected at least one team, a design order identifier associated with each of the graphical elements of the selected at least one team of the plurality of teams, a graphical link which allows the user to be taken to one of a social networking site, blog, and java applet to input situations and collaborate with key stakeholders when selected, and a status indicator which is a circular graphical element that is filled when at least one team member of the at least one team is online and available for communication and is unfilled when no team member of the at least one team is online and is available for communication,
wherein the design order identifier associated with each of the selected at least one team indicates an order in which a design flow occurs for each of the selected at least one team, and
wherein the SEIG tool comprises a social tagging tool which categorizes content that is used in the collaborating between the one or more of user, the subject matter expert, the stakeholder, and the decision maker,
wherein the SEIG tool is a web client application that provides the GUI which includes the field of entry, links, and interfaces to one or more of the plurality of collaboration tools,
wherein the graphical elements of the selected at least one team in the landing page interface comprise a link to a separate subject matter experts (SME) page which includes a list of questions and answers to the list of questions to show whether a situation has been previously addressed, and
wherein the collaborative technology of the SEIG tool includes a chat session between the selected at least one team, graphical elements of the selected at least one team using the SEIG tool, the status indicator which is the circular graphical element that is filled when at least one team member of the at least one team is online and available for communication and is unfilled when no team member of the at least one team is online and is available for communication, a section including additional information such as at least one links to pages, links to tools, common questions and answers, and a collaborate now feature to schedule meetings, track participation, and record participation.

19. The method of claim 18, wherein the SEIG tool is configured to supplement existing corporate processes or company-specific governance processes and includes a project repository tool and application delivery tool.

20. A non-transitory computer program product for executing a situational environment information technology governance (SEIG) tool, the computer program product comprising:
a computer readable storage media;
first program instructions to implement an entering process that includes an entry screen with a field provided by the SEIG tool and which provides entry of one or more questions to facilitate communications with one or more of a user, a subject matter expert, a stakeholder, and a decision maker;
second program instructions to receive a selection of the one or more of the user, the subject matter expert, the stakeholder, and the decision maker using the SEIG tool;
third program instructions to initiate an invitation to the selected one or more of the user, the subject matter expert, the stakeholder, and the decision maker using the SEIG tool; and
fourth program instructions to implement a communication process for collaborating between the selected one or more of the user, the subject matter expert, the stakeholder, and the decision maker using a collaborative technology of the SEIG tool, and wherein the first, second, and third, program instructions are stored on the computer readable storage media,
wherein the receiving the selection includes receiving a selection of one or more teams from a plurality of teams via the SEIG tool,
wherein a landing page interface of the SEIG tool comprises a virtual representation which includes a graphical user interface (GUI) comprising graphical elements of the selected one or more teams using the SEIG tool, a design order identifier associated with each of the graphical elements of the selected one or more teams of the plurality of teams, a link which allows the user to be taken to one of a social networking site, blog, and java applet to input situations and collaborate with key stakeholders when selected, and a status indicator which is a circular graphical element that is filled when at least one team member of the one or more teams is online and available for communication and is unfilled when no team member of the one or more teams is online and is available for communication, wherein the design order identifier associated with each of the selected one or more teams indicates an order in which a design flow occurs for each of the selected one or more teams, wherein the SEIG tool collaborating between the one or more of the user, the subject matter expert, the stakeholder, and the decision maker utilizes a plurality of collaboration tools which include instant messaging, teleconferencing, video conferencing, white board, and wikis, wherein the SEIG tool comprises a social tagging tool which categorizes content that is used in the collaborating between the one or more of user, the subject matter expert, the stakeholder, and the decision maker, wherein the SEIG tool is a web client application that provides the GUI which includes the field of entry, links, and interfaces to one or more of the plurality of collaboration tools, wherein the graphical elements of the selected one or more teams in the landing page interface comprise a link to a separate subject matter experts (SME) page which includes a list of questions and answers to the list of questions to show whether a situation has been previously addressed, wherein the collaborative technology of the SEIG tool includes a chat session between the selected one or more of the user, the subject matter expert, the stakeholder, and the decision maker, graphical elements of the selected one or more teams using the SEIG tool, the status indicator which is the circular graphical element that is filled when at least one team member of the one or more teams is online and available for communication and is unfilled when no team member of the one or more teams is online and is available for communication, a section including additional information such as at least one links to pages, links to tools, common questions and answers, and a collaborate now feature to schedule meetings, track participation, and record participation, and wherein the chat session comprises a web conferencing tool.

* * * * *